(12) United States Patent
Chen et al.

(10) Patent No.: US 11,451,858 B2
(45) Date of Patent: Sep. 20, 2022

(54) METHOD AND SYSTEM OF PROCESSING INFORMATION FLOW AND METHOD OF DISPLAYING COMMENT INFORMATION

(71) Applicant: Shanghai Bilibili Technology Co., Ltd., Shanghai (CN)

(72) Inventors: Zhiwei Chen, Shanghai (CN); Longwen Gao, Shanghai (CN); Yingxuan Shi, Shanghai (CN); Chaoran Li, Shanghai (CN); Qi Tang, Shanghai (CN); Jianqiang Ding, Shanghai (CN); Bo Wang, Shanghai (CN); Tianxiao Ye, Shanghai (CN); Xiaolong Yan, Shanghai (CN); Dada Liao, Shanghai (CN); Xiang Zhu, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/018,137

(22) Filed: Sep. 11, 2020

(65) Prior Publication Data
US 2021/0084362 A1 Mar. 18, 2021

(30) Foreign Application Priority Data
Sep. 12, 2019 (CN) .......................... 201910863122.6

(51) Int. Cl.
| | | |
|---|---|---|
| H04N 21/431 | (2011.01) | |
| G06T 7/11 | (2017.01) | |
| H04N 19/46 | (2014.01) | |
| H04N 21/478 | (2011.01) | |
| H04N 21/218 | (2011.01) | |
| H04N 21/43 | (2011.01) | |

(Continued)

(52) U.S. Cl.
CPC .......... H04N 21/4316 (2013.01); G06T 7/11 (2017.01); H04N 19/46 (2014.11); H04N 21/2187 (2013.01); H04N 21/4302 (2013.01); H04N 21/4788 (2013.01); *G06T 2207/10016* (2013.01)

(58) Field of Classification Search
CPC .......... H04N 21/4316; H04N 21/2187; H04N 21/4302; H04N 21/4788; H04N 19/46; G06T 7/11; G06T 2207/10016
USPC ..................................................... 725/37
See application file for complete search history.

(56) References Cited

U.S. PATENT DOCUMENTS 10,560,502 B2 * 2/2020 Kieft .................. H04L 65/4069
2019/0087981 A1 * 3/2019 Fuh ...................... H04N 1/6008

(Continued)

*Primary Examiner* — Dominic D Saltarelli
(74) *Attorney, Agent, or Firm* — BakerHostetler

(57) ABSTRACT

The present disclosure describes techniques of processing information flow and synchronously displaying image s, mask frames and comment information. According to the present disclosure, a system processes a first information stream uploaded by a stream pushing terminal to obtain a frame image and mask frame data, the mask frame data corresponding to the frame image and identifying a time-stamp offset indicative of a time difference between the mask frame data and a playing timestamp of the frame image. The system synthesizes the frame image and the mask frame data to generate a second information stream; and output the second information stream to a client for synchronously displaying the image frame, a corresponding mask frame, and the comment information.

20 Claims, 9 Drawing Sheets

(51) Int. Cl.
*H04N 21/4788* (2011.01)
*H04N 21/2187* (2011.01)

(56) References Cited

U.S. PATENT DOCUMENTS

2020/0228729 A1* 7/2020 Okuno .................. G06T 7/11
2022/0014819 A1* 1/2022 Liu ..................... H04N 19/46

* cited by examiner

METHOD AND SYSTEM OF PROCESSING INFORMATION FLOW AND METHOD OF DISPLAYING COMMENT INFORMATION

CROSS-REFERENCE TO RELATED APPLICATION

The present application claims priority to Chinese patent application number 201910863122.6, filed on Sep. 12, 2019, entitled "a method and system of processing information flow and a method of displaying live comment information". The entire content of the above-identified application is incorporated in the present application by reference.

BACKGROUND

When a user watches a live broadcast, if there are a large number of viewers, the user often encounters a large number of live comments, i.e., comments shown scrolling (e.g., from right to left, left to right, top to bottom, bottom to top) across the content, which may be referred to as "bullet screens." Live broadcast images may be covered by the live comments, affecting normal watching of the user. If the user chooses to directly close the live comments, viewing experience is poor, and if the user sets the live comments to display on top, when there are too many live comments, it will temporarily cause the live comments to be irrelevant to the live broadcast content.

SUMMARY

In view of the problem that the mask information, the video information, and the live comment information cannot be synchronously displayed in a live broadcast scene, the present invention provides a method and a system of processing information flow and a method of displaying live comment information for ensuring the mask information, the video information and the live comment information played synchronously by the client.

A method of processing information flow applied to a server, the method comprising:

the server identifies a main area of at least one frame image in a first information stream to generate a mask frame data identifying a timestamp offset;

the server synthesizes the at least one frame image and corresponding mask frame data to generate a second information stream, and sends the second information stream to a client.

Preferably, the server identifies a main area of at least one frame image in a first information stream to generate a mask frame data identifying a timestamp offset, comprises:

acquiring at least one first data unit from the first information stream, wherein the first data unit comprises meta-information and first data information;

decoding the first data information to obtain the frame image and a first timestamp corresponding to the frame image; identifying the main area of the frame image to generate the mask frame data, obtaining the timestamp offset of the mask frame data according to the first timestamp of the frame image and corresponding meta-information, and storing the timestamp offset into the mask frame data.

Preferably, the meta-information comprises a second timestamp, wherein the second timestamp determines a playing time of the frame image in the first data information.

Preferably, the server synthesizes the at least one frame image and corresponding mask frame data to generate a second information stream, and sends the second information stream to a client, comprises:

encoding the frame image and corresponding mask frame data to obtain second data information;

combining the second data information with the meta-information to generate a second data unit;

combining a plurality of the second data units to generate the second information stream, and sending the second information stream to the client.

Preferably, an image segmentation algorithm is used to identify the main area of at least one frame image in the first information stream.

The present invention further provides a method of displaying live comment information applied to the client, the method comprising:

the client acquires a second information stream and live comment information sent by the server;

the client analyzes the second information stream to obtain at least one frame image, corresponding mask frame data and meta-information, wherein the mask frame data comprises a timestamp offset;

the client draws an area corresponding to the mask frame data, the live comment information and the frame image on a screen, and controls the mask frame data, the corresponding frame image, and the live comment information to play synchronously according to the meta-information and the timestamp offset.

Preferably, the client analyzes the second information stream to obtain at least one frame image, corresponding mask frame data, and meta-information, comprises:

acquiring at least one second data unit from the second information stream, wherein the second data unit comprises meta-information and second data information;

decoding the second data information to obtain the frame image and the mask frame data corresponding to the frame image.

Preferably, the meta-information comprises a second timestamp, wherein the second timestamp determines a playing time of the frame image in the second data information.

Preferably, the client draws an area corresponding to the mask frame data, the live comment information and the frame image on a screen, and controls the mask frame data, the corresponding frame image and the live comment information to play synchronously according to the meta-information and the timestamp offset, comprises:

adjusting the playing time of the mask frame data according to the second timestamp and the timestamp offset of the mask frame data;

rendering the mask frame data, and at the time corresponding to the second timestamp, drawing the mask frame data and the live comment information into the frame image, wherein the live comment information is displayed in an area other than the area corresponding to the mask frame data.

Preferably, rendering the mask frame data, and at the time corresponding to the second timestamp, drawing the mask frame data and the live comment information into the frame image, wherein the live comment information is displayed in an area other than the area corresponding to the mask frame data, comprises:

the mask frame data is a transparent channel, and when the live comment information is displayed in the area other than the area corresponding to the mask frame data, the live comment information and a transparency of the mask frame data are multiplied and drawn into the frame image.

A system of processing information flow comprising the server and the client, wherein:

the server identifies a main area of at least one frame image in a first information stream to generate a mask frame data identifying a timestamp offset, synthesizes the at least one frame image and corresponding mask frame data to generate a second information stream, and sends the second information stream to the client;

the client acquires the second information stream and live comment information sent by the server, analyzes the second information stream to obtain at least one frame image, the corresponding mask frame data and the meta-information, wherein the mask frame data comprises the timestamp offset, draws an area corresponding to the mask frame data, the live comment information and the frame image on a screen, and controls the mask frame data, the corresponding frame image and the live comment information to play synchronously according to the meta-information and the timestamp offset.

The present invention further provides a computing device, which comprises a memory, a processor, and computer programs that stored in the memory and operable on the processor, wherein when the computer programs are executed by the processor, the method of processing information flow applied to the server is realized.

The present invention further provides a computing device, which comprises a memory, a processor, and computer programs that stored in the memory and operable on the processor, wherein when the computer programs are executed by the processor, the method of displaying live comment information applied to the client is realized.

The present invention further provides a computer-readable storage medium, which stores computer programs, wherein when the computer programs are executed by a processor, the method of processing information flow applied to the server is realized.

The present invention further provides a computer-readable storage medium, which stores computer programs, wherein when the computer programs are executed by a processor, the method of displaying live comment information applied to the client is realized.

The technical solution has the beneficial effects that:

In the technical scheme, the server analyzes a first information stream uploaded by a stream pushing terminal to obtain a frame image and a mask frame data corresponding to the frame image and identifying a timestamp offset, determines a time difference between the mask frame data and a playing timestamp of the frame image through the timestamp offset, and synthesizes the frame image and the mask frame data to generate a second information stream and output to the client; the client can obtain the frame image and the mask frame data by analyzing the second information stream, adjusts a display time of the mask frame data according to the timestamp offset to enable that the mask frame data, the frame image and a corresponding live comment information are displayed at the same time, so that users can watch fluency, and simultaneously enables the live comment information to be displayed in an area other than the area corresponding to the mask frame data, to avoid a main content in the frame image is covered by the live comment, and improve the user's viewing experience.

DETAILED DESCRIPTION OF ILLUSTRATIVE EMBODIMENTS

Figure 1:
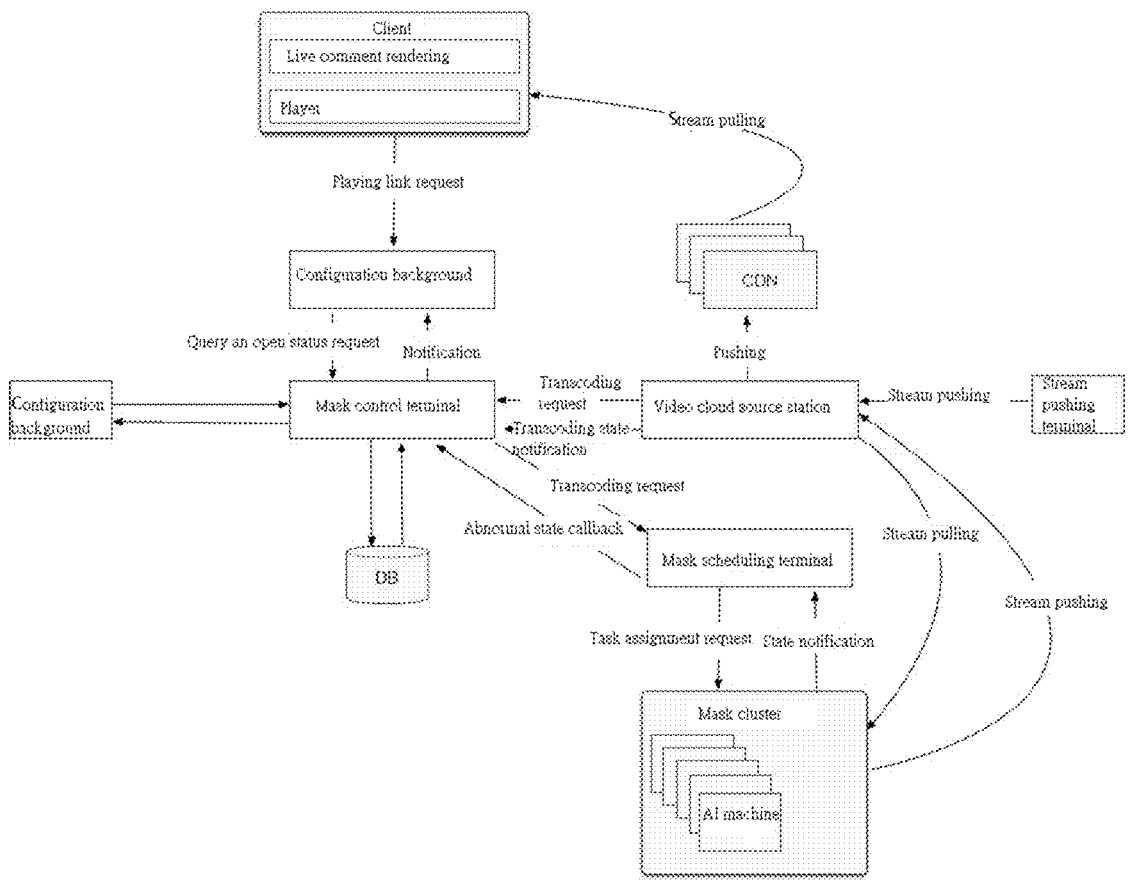
FIG. 1 illustrates a block diagram of a system of processing information flow applied to a live broadcast scene according to the present invention.

The advantages of the present invention will be further described below with reference to the drawings and specific embodiments.

Exemplary embodiments will be described in detail here, examples of which are illustrated in accompanying drawings. When following descriptions refer to the accompanying drawings, same numerals in different drawings represent the same or similar elements unless otherwise indicated. The implementations described in the following exemplary embodiments do not represent all implementations consistent with the present disclosure. Rather, they are merely examples of devices and methods consistent with some aspects of the present disclosure, as detailed in appended claims.

The terminology used in this disclosure is only for purpose of describing particular embodiments and is not intended to limit the disclosure. As used in this disclosure and the appended claims, the singular forms "a", "an" and "the" are intended to include the plural forms as well, unless the context clearly indicates otherwise. It should also be understood that the term "and/or" as used herein refers to and includes any or all possible combinations of one or more of associated listed items.

It should be understood that, although terms first, second, third, and so on may be used in this disclosure to describe various information, such information should not be limited to these terms. These terms are only used to distinguish the same type of information from each other. For example, without departing from scope of the present disclosure, the first information may also be referred to as the second information, and similarly, the second information may also be referred to as the first information. Depending on context, the word "if" as used herein can be interpreted as "at" or "when" or "in response to determination".

In the description of the present invention, it should be understood that numerical labels before steps do not indicate order of the steps before and after execution, and are only used to facilitate the description of the present invention and distinguish each step, so it cannot be understood as a limitation on the present invention.

The video in the embodiment of the present application can be presented in large video playing devices, game consoles, desktop computers, smart phones, tablets, MP3 (Moving Picture Experts Group Audio Layer III, moving picture expert compression standard audio layer) players, MP4 (Moving Picture Experts Group Audio Layer IV, moving picture expert Compression standard audio level) players, laptops, e-book readers, and other display terminals.

A system of processing information flow of the embodiment of the present application can be applied to a live broadcast scene, for example, can be applied to an e-commerce live broadcast, a training live broadcast, a match live broadcast, a news release live broadcast, interactive video between viewers and anchors or video broadcasters, interactive games playing (for example: "Black Mirror" or "Invisible Guardian" in the industry) and other online services. In the embodiment of the present application, the system of processing information flow is applied to a live video as an example, but not limited thereto.

At present, in an on-demand scene, a mask is usually added to display the live comments in an area other than a mask area in a playing interface, to prevent the live comments from covering a main area of the playing interface. However, for a live broadcast scene, a server processes a live video stream uploaded by an anchor to generate mask information and a corresponding mask timestamp, but the mask timestamp is generated from a start time of the anchor starting the live broadcast, if a client enters the live broadcast room at a certain time after starting the live broadcast (not the start time), video information viewed by the client is based on a current start time of playing, and the timestamp of the mask information displayed on the client is based on the start time of the anchor starting the live broadcast, so that a reference standard of a playing timestamp of the video information is different from that of the mask timestamp of the mask information, resulting in the video information, the live comment information, and the mask information cannot be synchronized, and affecting the user's viewing experience. In the embodiment of the present application, referring to FIG. 1, a server in the system of processing information flow is constituted of a video cloud source station, a mask cluster, a mask scheduling terminal, a mask control terminal, a configuration background, and so on. A stream pushing terminal (a live broadcast terminal or a anchor terminal) sends a live video stream to the video cloud source station, the video cloud source station sends a transcoding request to the mask control terminal, and the mask control terminal sends the transcoding request to the mask scheduling terminal, and after receiving the transcoding request, the mask scheduling terminal sends a task assignment request to the mask cluster to query whether there is an idle artificial intelligence (AI) machine in the mask cluster, wherein, the AI machines are mask recognition instances, and each of the AI machines services for a live broadcast room; if there is no idle AI machine, an abnormal state callback is fed back to the mask control terminal, and if there is the idle AI machine, a RTMP (Real Time Messaging Protocol) video stream is pulled from the video cloud source station, each frame image in the video stream is identified by the AI machine to generate mask frame data, and the mask frame data is pushed to the video cloud source station, the video cloud source station synthesizes the mask frame data and the frame image in a source video stream to generate a video stream with the mask frame data and push the video stream to a CDN (Content Delivery Network) node. When watching a live video, a user requests a playing link from the configuration background through a client (a playing terminal or a stream pulling terminal). After receiving the playing link request, the configuration background queries the mask control terminal for an open status request, and the mask control terminal queries a database (DB), to obtain whether a masking service is enabled in a live broadcast room, and obtain a feedback notification. If the live broadcast room accessed by the user enables the masking service, the client of the user pulls the video stream carrying the mask frame data via the CDN, analyzes the video stream, plays video information through a player, and renders a mask live comment, so that a video image, the mask frame and live comment information are displayed on a display screen of the client, and the live comment is displayed on an area outside the masked frame, thereby promoting the user's viewing effect. Only two configuration backgrounds, one client, and one stream pushing terminal are given herein, the application scene here may also include multiple configuration backgrounds, multiple clients, and multiple stream pushing terminals. The video cloud source station can be a cloud server or a local server. The devices on the client terminal and the stream pulling terminal can be mobile devices or other smart terminals that can upload videos.

Figure 2:
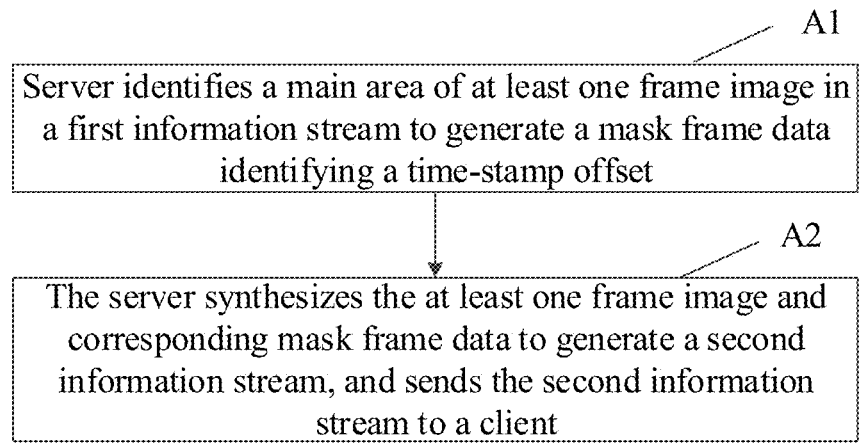
FIG. 2 illustrates a flowchart of a method of processing information flow applied to a server according to an embodiment of the present invention.

In order to solve a defect that mask information, the video information, and the live comment information cannot be synchronized in the live broadcast scene, the present invention provides a method of processing information flow applied to the server for ensuring that the mask information, the video information, and the live comment information are played synchronously by the client. Refer to FIG. 2, which is a schematic flowchart of a method of processing information flow on the server in accordance with a preferred embodiment of the present invention. As can be seen from the figure, the method of processing information flow on the server provided in the embodiment mainly includes the following steps:

A1, the server identifies a main area of at least one frame image in a first information stream to generate a mask frame data identifying a timestamp offset.

It should be noted, the main area is selected from at least one of the following:

a person area range, an animal area range, a landscape area range, an architectural area range, an artwork area range, a text area range, and a background area range different from persons, animals, buildings, and arts.

As an example but not a limitation, a semantic segmentation model (for example FCN, DilatedNet, deeplab, and other models) may be used to identify the main area of at least one frame image in the first information stream.

As a more preferred embodiment, the semantic segmentation model is a deeplab model. The deeplab model has advantages of good effect and fast speed. The Deeplab model mainly includes a network backbone for extracting feature map, a feature enhancement layer for enhancing features to reduce an impact of a size of the feature map, and a classification layer for predicting a category corresponding to each pixel (category 0 is usually a background), and the more commonly used categories are 91 categories of coco dataset, including persons, some animals, some common objects, and so on.).

In the embodiment, the method of processing information streams is applied to the server, and the server processes each first data unit in the first information stream uploaded by the stream pushing terminal. The first information stream on the stream pushing terminal is uploaded to the server through a Real-Time Messaging Protocol. Wherein, the stream pushing terminal uses Android system, IOS system, Windows system, or Mac OS X system.

Further, in the step A1, the step of the server identifies a main area of at least one frame image in a first information stream to generate a mask frame data identifying a time-stamp offset (referring to FIG. 3), includes:

A11, acquiring at least one first data unit from the first information stream, wherein the first data unit comprises meta-information and first data information.

In the embodiment, the first data unit may use AVPacket data structure. The first data information may be video image information to be decoded.

It should be noted, the meta-information may include: a second timestamp that determines a playing time of the frame image in the first data information. The second timestamp is the timestamp of the frame image played on the client; the meta-information further includes other information such as index, data duration, and so on.

A12, decoding the first data information to obtain the frame image and a first timestamp corresponding to the frame image.

In the step, the first data information is decoded through a decoder to obtain a corresponding frame image.

It should be noted that the first timestamp obtained in the step is different from the second timestamp, and the first timestamp is a display timestamp of the mask frame data.

A13, identifying the main area of the frame image to generate the mask frame data, obtaining the timestamp offset of the mask frame data according to the first timestamp of the frame image and corresponding meta-information, and storing the timestamp offset into the mask frame data.

In the step, an image segmentation algorithm is used to identify the main area of the frame image to generate the mask frame data, calculate a time difference between the first timestamp and the second timestamp, and store the timestamp offset in the mask frame data, to locate the time difference between the mask frame data and the corresponding frame image.

Wherein, the timestamp offset is the time difference between the first timestamp and the second timestamp.

In practical applications, the mask frame data can be a scalable vector graphics file. According to target data in the scalable vector graphics file and corresponding type, each of the target data and a corresponding type are encoded to generate binary files marked with the type of the target data, which improves data compression rate, saves data storage space, and facilitates data transmission.

It should be noted that the scalable vector graphics file uses an extensible markup language format. The target data is SVG graphics. SVG graphics are scalable and can maintain their graphic quality when size is changed. SVG can use some predefined shape elements to describe graphics, such as rectangles, lines, paths, and so on.

A2, the server synthesizes the at least one frame image and corresponding mask frame data to generate a second information stream, and sends the second information stream to a client.

It should be noted that the second information flow uses the Real-Time Messaging Protocol.

In the step, the decoded frame image, obtained mask frame data and the meta-information are synthesized to generate the second information stream with mask frame data, and the server sends the second information stream to the client, so that the video configured with the mask live comment can be watched on the client.

Further, in the step A2, the step of the server synthesizes the at least one frame image and corresponding mask frame data to generate a second information stream, and sends the second information stream to a client (referring to FIG. 4), includes:

A21, encoding the frame image and corresponding mask frame data to obtain second data information.

As an example but not a limitation, the mask frame data can be the scalable vector graphics file. According to target data in the scalable vector graphics file and corresponding type, each of the target data and a corresponding type are encoded to generate a binary file marked with the type of the target data, which improves data compression rate, saves data storage space, and facilitates data transmission.

While encoding the mask frame data, the frame image is compressed and encoded to reduce data transmission.

A22, combining the second data information with the meta-information to generate a second data unit.

A23, combining a plurality of second data units to generate the second information stream, and sending the second information stream to the client.

Further, the plurality of second data units are arranged to generate information stream according to the meta-information, and the server sends information stream to the client, so that the video image configured with the mask live comment can be watched on the client.

In the embodiment, the server analyzes the first information stream uploaded by the stream pushing terminal to obtain a frame image and a mask frame data corresponding to the frame image and identifying a timestamp offset, determines the time difference between the mask frame data and the playing timestamp of the frame image through the timestamp offset, synthesizes the frame image and the mask frame data to generate the second information stream and outputs the second information stream to the client; the client obtains the frame image and the mask frame data by analyzing the second information stream, and adjusts the display time of the mask frame data according to the timestamp offset so that the mask frame data and the frame image and the corresponding live comment information are displayed at the same time, which ensures user's viewing fluently, and meanwhile makes the live comment information display in an area other than the area corresponding to the mask frame data to avoid an occlusion of main contents in the frame image by the live comment, and improves the user viewing experience.

The above method of processing information stream on the server mainly describes the method flow of processing the first information stream on the server. When the client displays the second information stream, a method of displaying live comment information applied to the client includes the following steps (referring to FIG. 5):

B1, the client acquires a second information stream and live comment information sent by the server.

In the embodiment, the method of displaying live comment information is applied to the client, and the client acquires the second information stream and corresponding live comment information sent by the server. Wherein, the client can use Android system, IOS system, Windows system, or Mac OS X system.

It should be noted that the second information stream uses the Real-Time Messaging Protocol.

B2, the client analyzes the second information stream to obtain at least one frame image, corresponding mask frame data and meta-information, wherein the mask frame data includes the timestamp offset.

Further, the step B2 includes (referring to FIG. 6):

B21, acquiring at least one second data unit from the second information stream, wherein the second data unit includes the meta-information and second data information.

Wherein, the second data unit may use AVPacket data structure. The second data information may be the video image information to be decoded. The meta-information includes:

the second timestamp that determines the playing time of the frame image in the second data information, the second timestamp is the timestamp of the frame image played on the client; the meta-information further includes other information such as index, data duration, and so on.

B22, decoding the second data information to obtain the frame image and the mask frame data corresponding to the frame image.

In the embodiment, the mask frame data in the second data information is the binary file. During decoding, each key-value pair in the binary file is decoded. Using the key-value pair, a meaning represented by corresponding binary data can be effectively distinguished, in order to ensure the integrity of data during a decoding process.

In practical applications, a display ratio of each of the decoded mask frame data is enlarged according to a preset decompression proportion, thereby a mask area corresponding to the mask frame data and the main area of the frame image are consistent in size, and the user's viewing effect is ensured.

Specifically, the display ratio of the mask frame data may be enlarged by a way of bilinear stretching.

B3, the client draws an area corresponding to the mask frame data, the live comment information and the frame image on a screen, and controls the mask frame data, the corresponding frame image, and the live comment information to play synchronously according to the meta-information and the timestamp offset.

In the embodiment, decompressed mask frame data is rendered, the mask frame data and the live comment information are drawn into the frame image, and the mask frame data is displayed when the live comment information passes through the mask frame data.

Further, in the step B3, the step of the client draws an area corresponding to the mask frame data, the live comment information and the frame image on a screen, and controls the mask frame data, the corresponding frame image and the live comment information to play synchronously according to the meta-information and the timestamp offset (referring to FIG. 7), includes:

B31, adjusting the playing time of the mask frame data according to the second timestamp and the timestamp offset of the mask frame data, to make the playing time of the mask frame data and the second timestamp synchronized.

B32, rendering the mask frame data, and at the time corresponding to the second timestamp, drawing the mask frame data and the live comment information into the frame image, wherein the live comment information is displayed in an area other than the area corresponding to the mask frame data.

In practical applications, while the client displays received video and live comments, when the area corresponding to the mask frame data is in a range of the person area, the live comment information is not displayed in the range of the person area, but displayed in areas outside the range of the person area; when the area corresponding to the mask frame data is in a range of the text area, the live comment information is not displayed in the range of the text area, but displayed in areas outside the range of the text area; and when the area corresponding to the mask frame data is a range of the background area different from persons, animals, buildings, and arts, the live comment information is not displayed in the range of the background area, but displayed in areas outside the range of the background area.

In the embodiment, an edge feathering processing is performed on the area corresponding to the mask frame data to improve the smoothness of edges of the mask frame and make edges of the mask frame data softer and more natural, thereby improving a visual effect. In the process of playing video data, the playing time of the mask frame data is adjusted according to the second timestamp and the timestamp offset, and the processed mask frame data and the live comment information are drawn on the frame image. Thereby, a temporal consistency of the mask area, the live comment information, and the frame image of the video is guaranteed.

The mask frame data is in a transparent channel, and when the live comment information passes through the mask frame data, the live comment information and a transparency of the mask frame data are multiplied and drawn into the frame image. When displaying the live comment information, the live comment can gradually change from being completely opaque to being completely transparent at the edge of the mask frame data, making a mask softer and more natural, meanwhile effectively avoiding a problem that algorithms do not accurately identify a main edge of frames.

In the embodiment, the client obtains the frame image and the mask frame data by analyzing the second information stream, and adjusts the display time of the mask frame data according to the timestamp offset so that the mask frame data and the frame image and the corresponding live comment information are displayed at the same time, which ensures the user's viewing fluently, and meanwhile makes the live comment information display in an area other than the area corresponding to the mask frame data to avoid the occlusion of main contents in the frame image by the live comment, and improves the user viewing experience.

Figure 8:
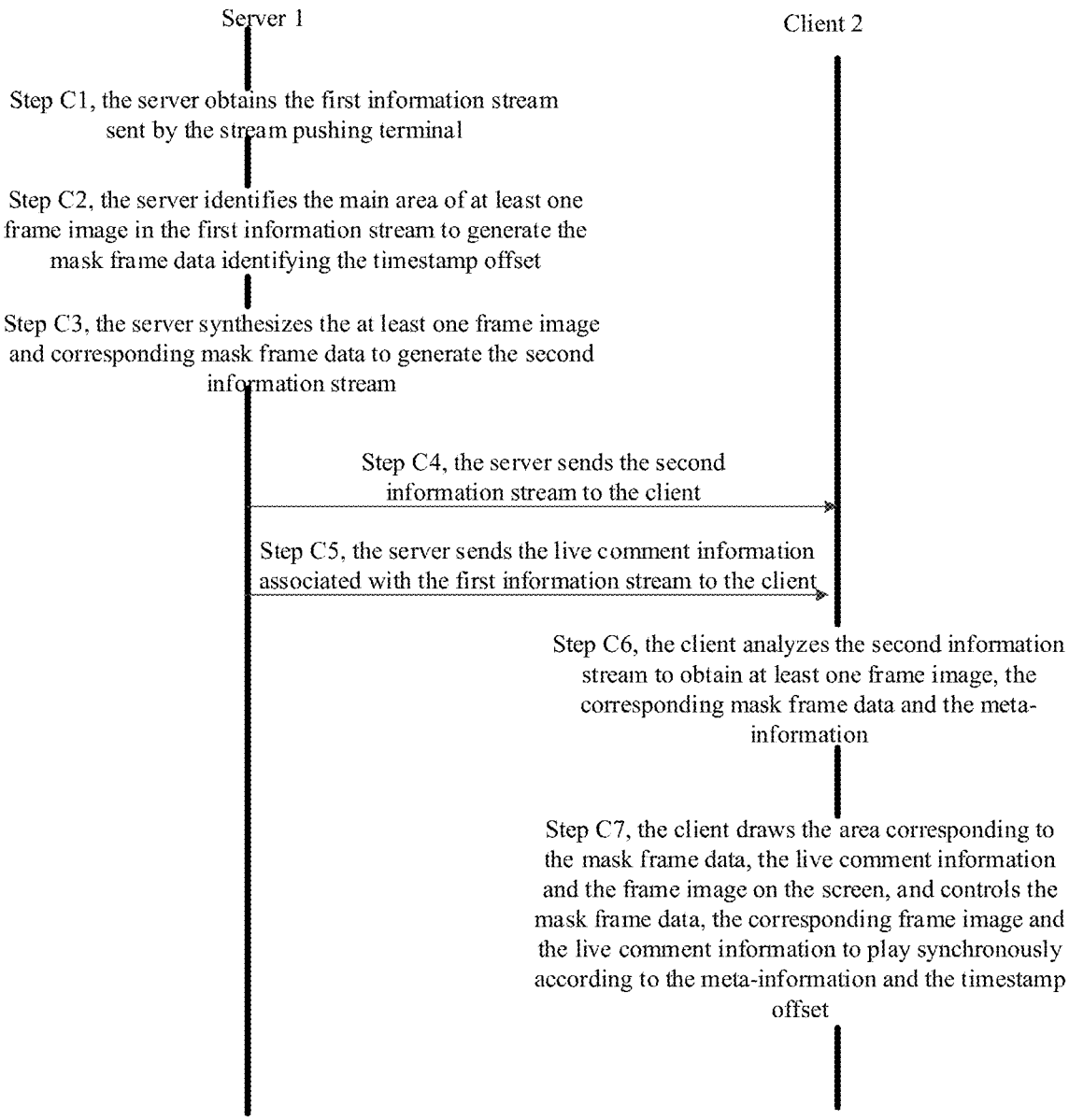
FIG. 8 illustrates a flowchart of a system of processing information flow according to an embodiment of the present invention.
Figure 9:
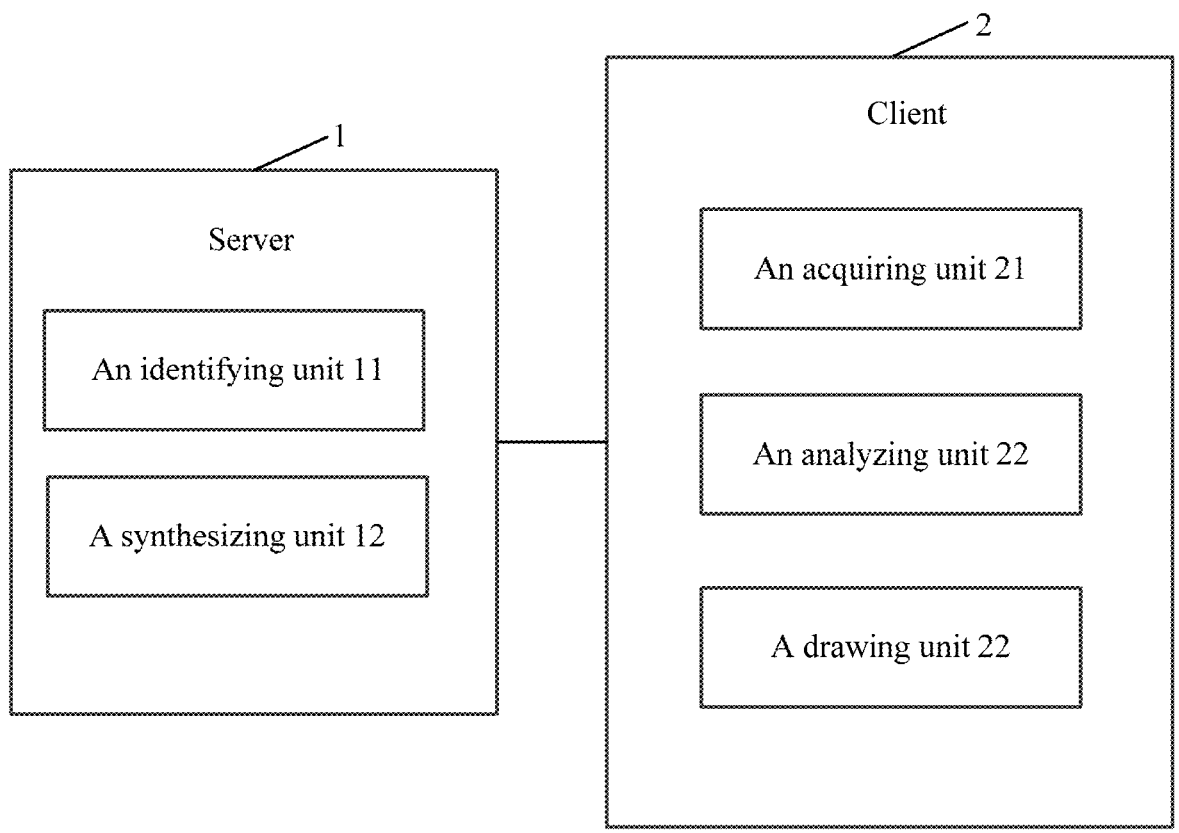
FIG. 9 illustrates a block diagram of a system of processing information flow according to an embodiment of the present invention.

As shown in FIG. 8 to FIG. 9, the present invention also provides a system of processing information flow, including the server 1 and the client 2.

The server 1 identifies the main area of at least one frame image in the first information stream to generate the mask frame data identifying the timestamp offset, synthesizes the at least one frame image and corresponding mask frame data to generate the second information stream, and sends the second information stream to the client 2.

The specific process is as follows (referring to FIG. 8):

C1, the server obtains the first information stream sent by the stream pushing terminal.

C2, the server identifies the main area of at least one frame image in the first information stream to generate the mask frame data identifying the timestamp offset.

C3, the server synthesizes the at least one frame image and corresponding mask frame data to generate the second information stream.

C4, the server sends the second information stream to the client.

C5, the server sends the live comment information associated with the first information stream to the client.

The client 2 acquires the second information stream and live comment information sent by the server 1, analyzes the second information stream to obtain at least one frame image, the corresponding mask frame data and the meta-information, wherein the mask frame data includes the timestamp offset, draws the area corresponding to the mask frame data, the live comment information and the frame image on the screen, and controls the mask frame data, the corresponding frame image and the live comment information to play synchronously according to the meta-information and the timestamp offset.

The specifical process is as follows (referring to FIG. 8):

C6, the client analyzes the second information stream to obtain at least one frame image, the corresponding mask frame data and the meta-information, wherein the mask frame data includes the timestamp offset.

C7, the client draws the area corresponding to the mask frame data, the live comment information and the frame image on the screen, and controls the mask frame data, the corresponding frame image, and the live comment information to play synchronously according to the meta-information and the timestamp offset.

As shown in FIG. 9, the server 1 includes an identifying unit 11 and a synthesizing unit 12, wherein:

The identifying unit 11 identifies the main area of at least one frame image in the first information stream to generate the mask frame data identifying the timestamp offset.

It should be noted, the main area is selected from at least one of the following:

the person area range, the animal area range, the landscape area range, the architectural area range, the artwork area range, the text area range, and the background area range different from persons, animals, buildings, and arts.

As an example but not a limitation, the semantic segmentation model (for example FCN, DilatedNet, deeplab, and other models) may be used to identify the main area of at least one frame image in the first information stream.

As a more preferred embodiment, the semantic segmentation model is the deeplab model. The deeplab model has advantages of good effect and fast speed. The Deeplab model mainly includes the network backbone for extracting feature map, the feature enhancement layer for enhancing features to reduce the impact of the size of the feature map, and the classification layer for predicting the category corresponding to each pixel (category 0 is usually the background), and the more commonly used categories are 91 categories of coco dataset, including persons, some animals, some common objects and so on.).

In the embodiment, the server processes each first data unit in the first information stream uploaded by the stream pushing terminal. The first information stream on the stream pushing terminal is uploaded to the server through a Real-Time Messaging Protocol.

The identifying unit 11 obtains at least one first data unit from the first information stream, wherein the first data unit includes the meta-information and the first data information.

In the embodiment, the first data unit may use AVPacket data structure. The first data information may be video image information to be decoded.

It should be noted, the meta-information includes the second timestamp, wherein the second timestamp determines the playing time of the frame image in the first data information. The second timestamp is the timestamp of the frame image played on the client; the meta-information further includes other information such as index, data duration, and so on.

The identifying unit 11 decodes the first data information to obtain the frame image and the first timestamp corresponding to the frame image.

It should be noted that the first timestamp obtained in the step is different from the second timestamp, and the first timestamp is a display timestamp of the mask frame data.

The identifying unit 11 identifies the main area of the frame image to generate the mask frame data, obtains the timestamp offset of the mask frame data according to the first timestamp of the frame image and corresponding meta-information, and stores the timestamp offset in the mask frame data.

Further, the image segmentation algorithm is used to identify the main area of the frame image to generate the mask frame data, calculate the time difference between the first timestamp and the second timestamp, and store the timestamp offset in the mask frame data in order to locate the time difference between the mask frame data and the corresponding frame image.

Wherein, the timestamp offset is the time difference between the first timestamp and the second timestamp.

In practical applications, the mask frame data can be the scalable vector graphics file. According to target data in the scalable vector graphics file and corresponding type, each of the target data and a corresponding type are encoded to generate binary files marked with the type of the target data, which improves data compression rate, saves data storage space, and facilitates data transmission.

It should be noted that the scalable vector graphics file uses the extensible markup language format. The target data is SVG graphics. SVG graphics are scalable and can maintain their graphic quality when size is changed. SVG uses some predefined shape elements to describe graphics, such as rectangles, lines, paths, and so on.

The synthesizing unit 12 synthesizes the at least one frame image and corresponding mask frame data to generate the second information stream, and sends the second information stream to a client. The synthesizing unit 12 sends information stream to the client for the client to watch the video configured with the mask live comment, through synthesizing the decoded frame image, obtained mask frame data and the meta-information to generate the second information stream.

It should be noted that the second information flow uses the Real-Time Messaging Protocol.

The synthesizing unit 12 encodes the frame image and corresponding mask frame data to obtain the second data information; combines the second data information with the meta-information to generate the second data unit; combines a plurality of second data units to generate the second information stream.

Further, the plurality of second data units are arranged in order to generate the information stream according to the meta-information, and the server 1 sends the information stream to the client 2, so that the video image configured with the mask live comment can be watched on the client 2.

As shown in FIG. 9, the client 2 includes an acquiring unit 21, an analyzing unit 22 and a drawing unit 23, wherein:

the acquiring unit 21 acquires the second information stream and live comment information.

In the embodiment, the client 2 acquires the second information stream and corresponding live comment information sent by the server 1.

It should be noted that the second information stream uses the Real-Time Messaging Protocol.

The analyzing unit 22 analyzes the second information stream to obtain at least one frame image, corresponding mask frame data and the meta-information, the mask frame data includes the timestamp offset.

The analyzing unit 22 acquires at least one second data unit from the second information stream, wherein the second data unit includes the meta-information and the second data information.

Wherein, the second data unit uses AVPacket data structure. The second data information may be the video image information to be decoded. The meta-information includes: the second timestamp that determines the playing time of the frame image in the second data information, the second timestamp is the timestamp of the frame image played on the client; the meta-information further includes other information such as index, data duration, and so on.

The analyzing unit 22 decodes the second data information to obtain the frame image and the mask frame data corresponding to the frame image.

In the embodiment, the mask frame data in the second data information is the binary file. During decoding, each key-value pair in the binary file is decoded. Using the key-value pair, the meaning represented by corresponding binary data can be effectively distinguished, in order to ensure the integrity of data during the decoding process.

In practical applications, the display ratio of each of the decoded mask frame data is enlarged according to the preset decompression proportion, thereby the mask area corresponding to the mask frame data and the main area of the frame image are consistent in size, and the user's viewing effect is ensured.

Specifically, the display ratio of the mask frame data may be enlarged by the way of bilinear stretching.

The drawing unit 23 draws the area corresponding to the mask frame data, the live comment information and the frame image on the screen, and controls the mask frame data, the corresponding frame image, and the live comment information to play synchronously according to the meta-information and the timestamp offset.

In the embodiment, the decompressed mask frame data is rendered, the mask frame data and the live comment information are drawn into the frame image, and the mask frame data is displayed when the live comment information passes through the mask frame data.

The drawing unit 23 adjusts the playing time of the mask frame data according to the second timestamp and the timestamp offset of the mask frame data in order to make the playing time of the mask frame data and the second timestamp synchronized; renders the mask frame data, and at the time corresponding to the second timestamp, draws the mask frame data and the live comment information into the frame image, wherein the live comment information is displayed in the area other than the area corresponding to the mask frame data.

In the embodiment, the edge feathering processing is performed on the area corresponding to the mask frame data to improve the smoothness of edges of the mask frame and make edges of the mask frame data softer and more natural, thereby improving the visual effect. In the process of playing video data, the playing time of the mask frame data is adjusted according to the second timestamp and the timestamp offset, and the processed mask frame data and the live comment information are drawn on the frame image.

Thereby, the temporal consistency of the mask area, the live comment information, and the frame image of the video is guaranteed.

The mask frame data is in the transparent channel, and when the live comment information passes through the mask frame data, the live comment information and the transparency of the mask frame data are multiplied and drawn into the frame image. When displaying the live comment information, the live comment can gradually change from being completely opaque to being completely transparent at the edge of the mask frame data, making the mask softer and more natural, meanwhile effectively avoiding the problem that algorithms do not accurately identify the main edge of frames.

Figure 10:
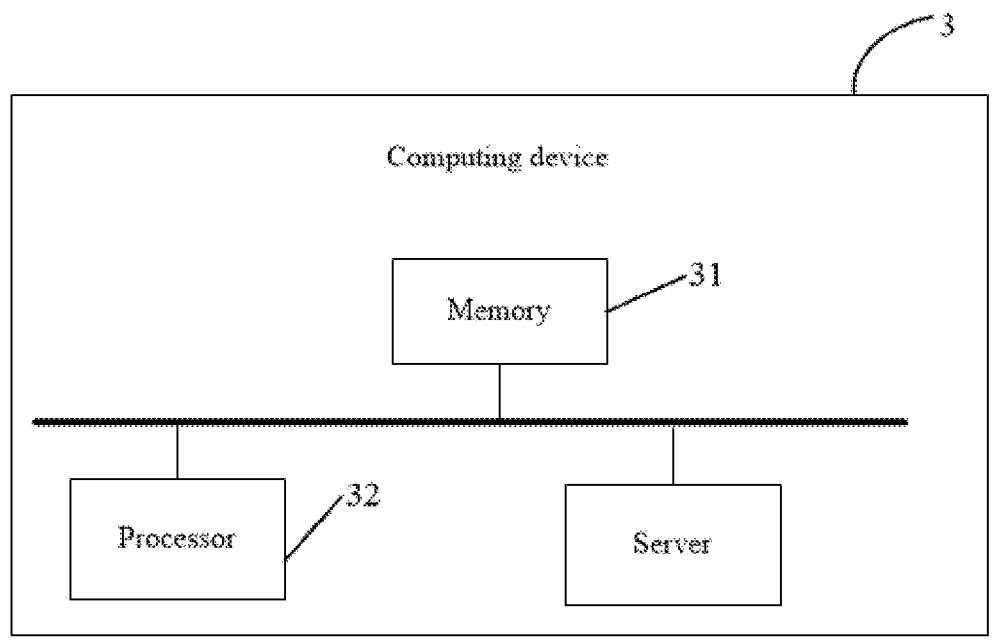
FIG. 10 illustrates a diagram of hardware architecture of a computing device according to an embodiment of the present invention.
Figure 11:
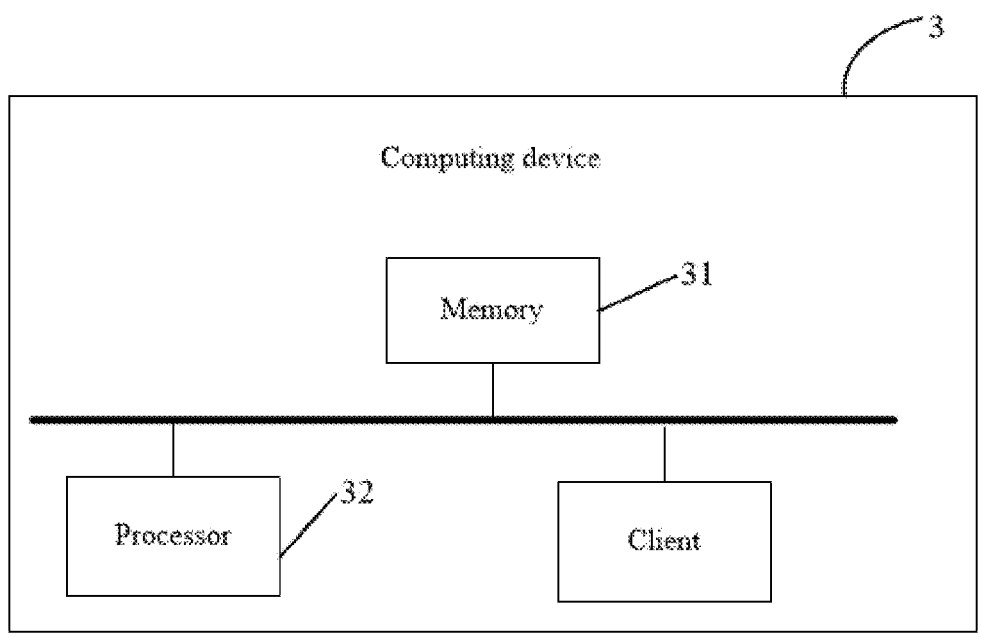
FIG. 11 illustrates a diagram of hardware architecture of a computing device according to another embodiment of the present invention.

As shown in FIG. 10 to FIG. 11, a computing device 3, the computing device 3 includes:

a memory 31, configured to store executable program code;

a processor 32, configured to call the executable program codes in the memory 31, and implement the above steps of the method of processing information flow on the server.

In FIG. 10 to FIG. 11, one processor 32 is taken as an example.

As a non-volatile computer-readable storage medium, the storage 31 stores a non-volatile software program, a non-volatile computer-executable program, instructions, and modules, such as program instructions or modules corresponding to the method of processing information flow applied to a server or the method of displaying live comment information applied to a client. The processor 32 executes various functional applications and data processing by carrying out the non-volatile computer-executable program, instructions, and modules, that is, achieving the method of processing information flow on the server and the method of displaying live comment information on the client in the foregoing embodiments.

The memory 31 includes a program storage area and a data storage area, wherein the program storage area stores an operation system and an application program required for at least one function, the data storage area stores a user's voice inputting request on the computing device 3. In addition, the memory 31 includes a high-speed random access memory, and further includes a non-volatile storage, such as at least one magnetic disk storage device, a flash memory device, or other non-volatile solid-state storage device. In some embodiments, the memory 31 is optionally remotely set relative to processor 32, and these remote memories 31 are connected to the client or the server through a network. Examples of the above network include, but are not limited to, the Internet, an intranet, a local area network, a mobile communication network, and combinations thereof.

Figure 3:
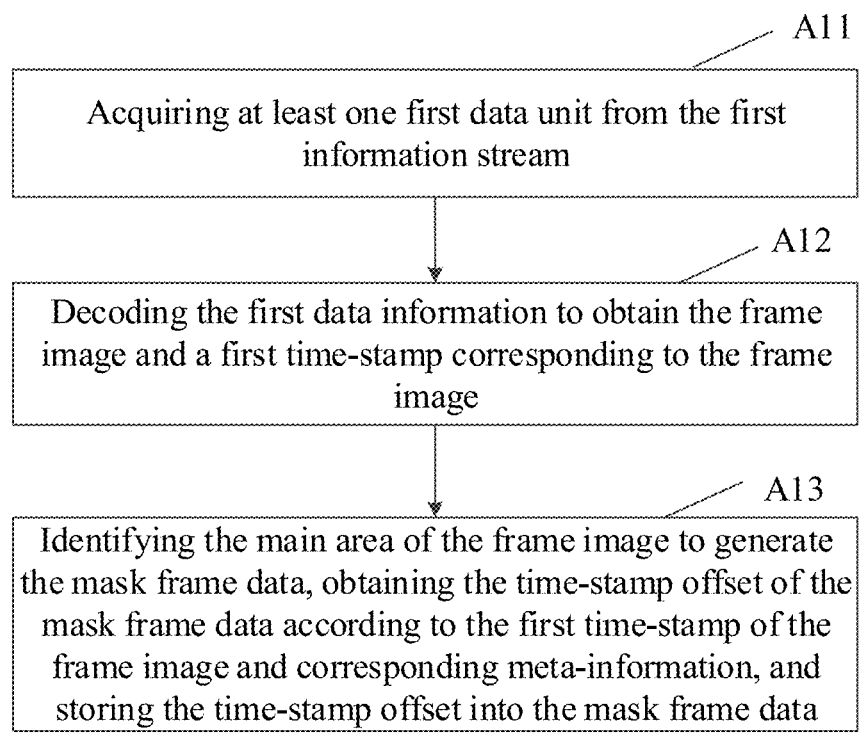
FIG. 3 illustrates a flowchart of a method of generating mask frame data according to an embodiment of the present invention.
Figure 4:
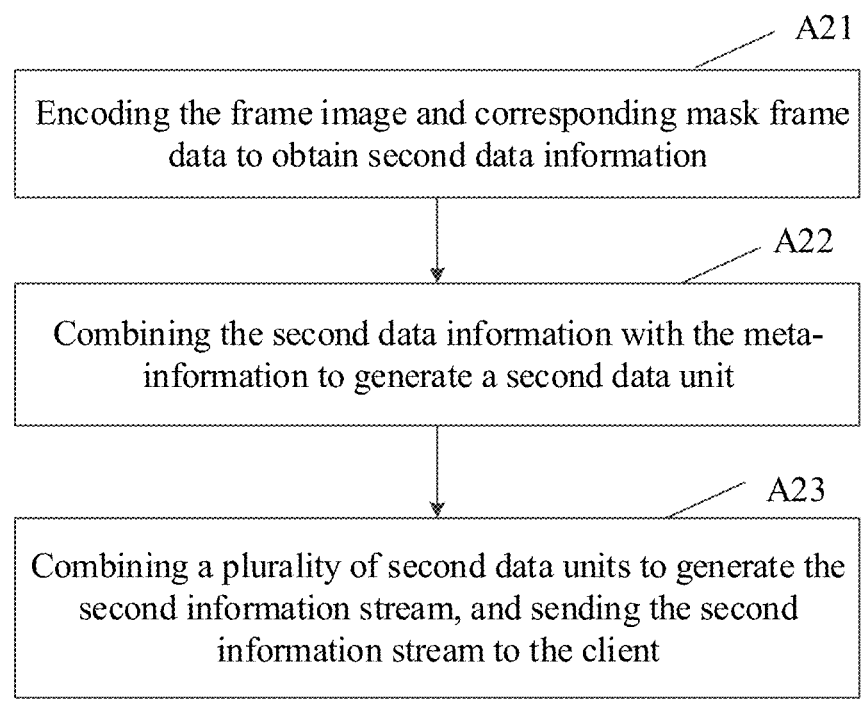
FIG. 4 illustrates a flowchart of a method of generating a second information stream according to an embodiment of the present invention.

One or more modules are stored in the memory 31, and when executed by the one or more processors 32, the one or more modules perform the method of processing information flow in any of the above embodiments, such as implements the method steps in FIGS. 2 to 4 described above, and implements functions of the server 1 shown in FIGS. 8-9.

Figure 5:
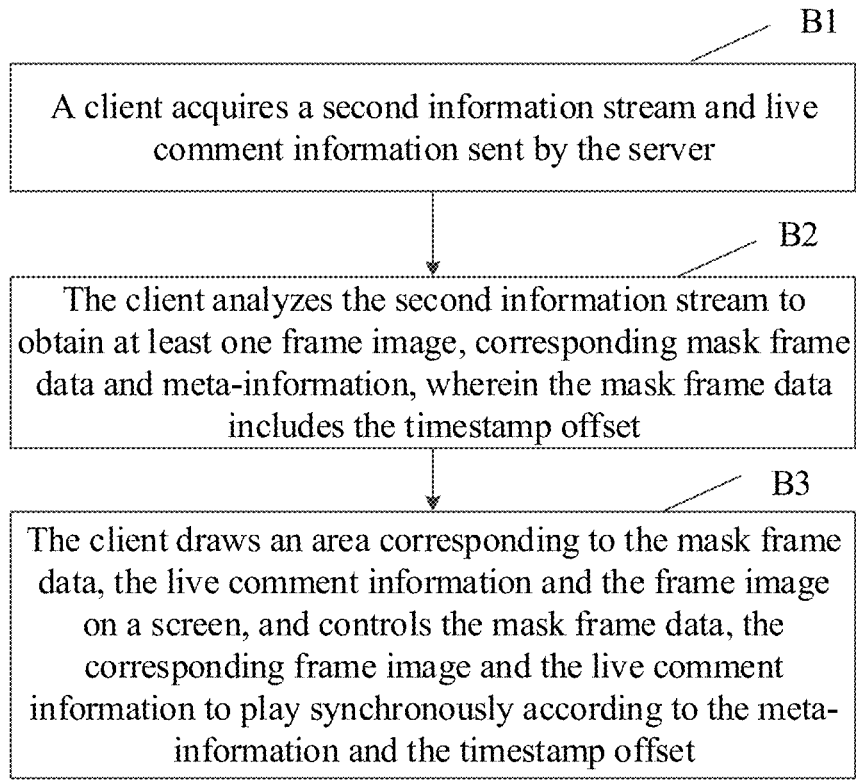
FIG. 5 illustrates a flowchart of a method of displaying live comment information applied to a client according to an embodiment of the present invention.
Figure 6:
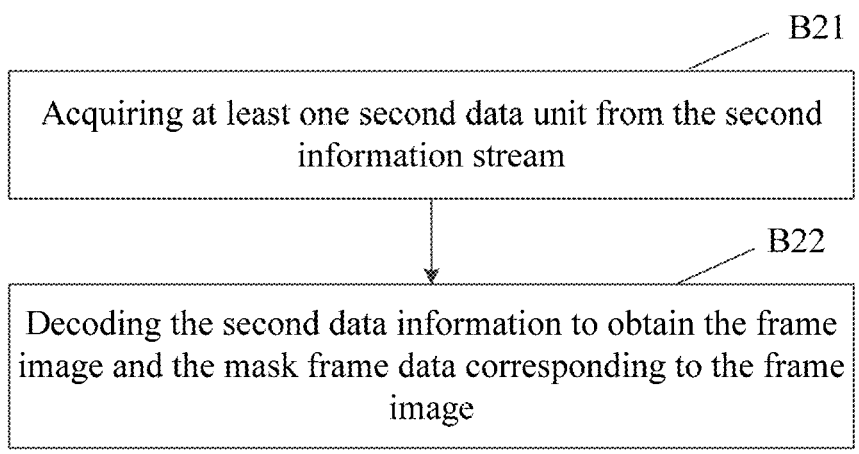
FIG. 6 illustrates a flowchart of a method of analyzing the second information stream according to an embodiment of the present invention.
Figure 7:
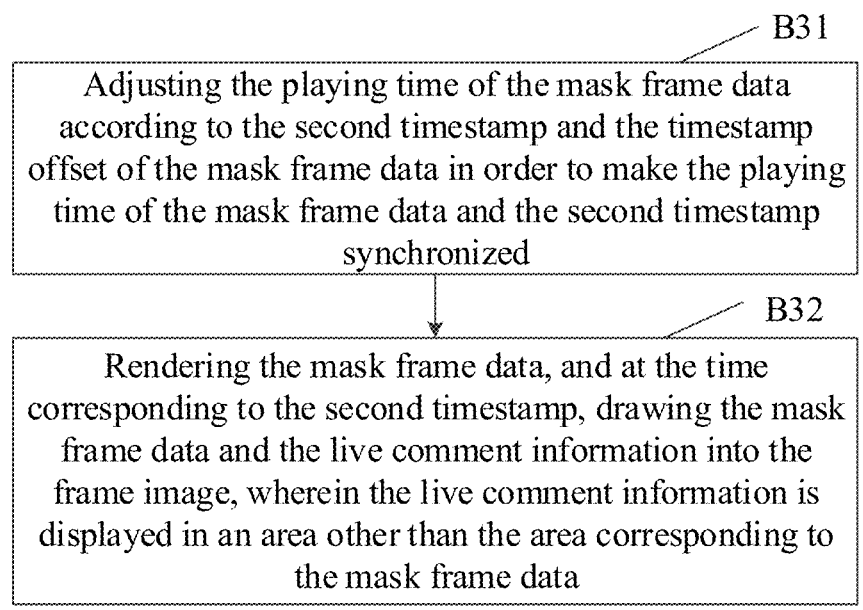
FIG. 7 illustrates a flowchart of a method of playing synchronously according to an embodiment of the present invention.

One or more modules are stored in the memory 31, and when executed by the one or more processors 32, the one or more modules perform the method of displaying live comment information in any of the above embodiments, such as implements the method steps in FIGS. 5 to 7 described above, and implements functions of the client 2 shown in FIGS. 8-9.

The above products can execute the methods provided in the embodiment of the present application, and has corresponding function modules and beneficial effects when executing the methods. For technical details that are not described in detail in this embodiment, can be referred to as the methods provided in the embodiments of the present disclosure.

The computing device 3 in the embodiment of the present disclosure exists in various forms, including but not limited to:

First, mobile communication equipment: is characterized by mobile communication functions, and has main goal to provide voice and data communication. Such terminals include smart phones (such as iPhone), multimedia phones, feature phones, and low-end phones, and so on.

Second, ultra-mobile personal computer equipment: belongs to category of personal computers, has computing and processing functions, and generally has characteristics of mobile Internet access. Such terminals include PDA, MID, and UMPC devices, such as iPad and so on.

Third, portable entertainment equipment: can display and play multimedia contents. Such terminals include audio and video players (such as iPods), handheld game consoles, e-books, smart toys, portable car navigation devices, and so on.

Forth, server: is a device providing computing services. The composition of the server includes a processor, hard disk, memory, system bus, and so on. The server and general computer are similar in architecture. However, due to a demand of providing highly reliable services, the server has higher requirements in terms of processing power, stability, reliability, security, scalability, manageability, and other aspects.

Fifth, other electronic devices with data interaction function.

An embodiment of the present application provides a non-volatile computer-readable storage medium, the computer-readable storage medium stores computer-executable instructions, and the computer-executable instructions are executed by one or more processors, such as a processor 32 in FIG. 10, so the above one or more processors 32 may execute the method of processing information flow in any of the above method embodiments, for example, implementing the method steps in FIGS. 2 to 4 described above, and implements functions of the server 1 shown in FIGS. 8-9.

Another embodiment of the present application provides a non-volatile computer-readable storage medium, the computer-readable storage medium stores computer-executable instructions, and the computer-executable instructions are executed by one or more processors, such as a processor 32 in FIG. 11, so the above one or more processors 32 may execute the method of displaying live comment information in any of the above method embodiments, for example, implementing the method steps in FIGS. 5 to 7 described above, and implements functions of the client 2 shown in FIGS. 8-9.

The embodiments of the device described above are only schematic, and the units described as separate components may or may not be physically separated, and components displayed as units may or may not be physical units, that is, the components displayed as units may be located in one place, or can be distributed to at least two network elements. Part or all of modules may be selected according to actual demands to achieve the solutions in the embodiments of the present disclosure. Those of ordinary skill in the art can understand and implement without creative labor or efforts.

Through the description of the above embodiments, those of ordinary skill in the art can clearly understand that the embodiments can be implemented by means of software plus a general hardware platform, of course, can also be implemented by hardware. Those of ordinary skill in the art can understand that all or part of processes in the method of the foregoing embodiments can be completed by using a computer program to instruct related hardware. The program can be stored in a computer-readable storage medium. While the program is executed, the processes of the embodiments of the methods described above may be included. The storage medium may be a magnetic disk, an optical disk, a read-only memory (ROM), or a random access memory (RAM), and so on.

The First Embodiment

Figure 12:
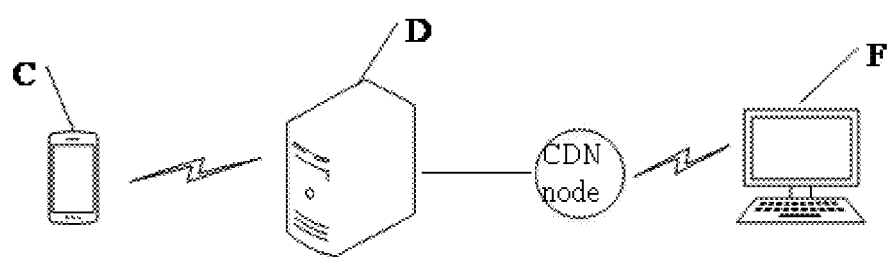
FIG. 12 illustrates a schematic diagram of a system of processing information flow according to an embodiment of the present invention.

Referring to FIG. 12, a system of processing information flow applied to a live broadcast scene is taken as an example: a user performs live broadcast from 11:00 to 12:00 through a stream pushing terminal C, and the stream pushing terminal C sends information stream to server D from 11:00, server D analyzes received information stream and identifies a type of each of first data unit in the information stream, wherein, the first data unit may be a video unit or an audio unit. If the first data unit is the video unit, the video unit is decoded, a frame image in the video unit, a first timestamp t1 and meta-information are obtained, a second timestamp t2 in the meta-information is extracted, and the frame image is identified to generate a mask frame data. A timestamp offset of the mask frame data relative to the second timestamp is obtained according to the first timestamp t1 and the second timestamp t2. The timestamp offset is added to the mask frame data. Number of mask frames and corresponding frame data are encoded to generate a second data unit, and the second data unit and the audio unit are sorted and combined according to an order of original information stream to generate a new information stream. Server D pushes the new information stream and live comment information to a CDN node, and the CDN node modifies the second timestamp t2 in the new information stream (for example: the second timestamp is modified to t3); when it is at 11:30, the client F requests live information stream from the CDN node, the CDN node sends the modified information flow and the live comment information to the client F. The client F parses the information flow to extract audio information, frame image, mask frame data, and the live comment information, adjusts a display time of the mask frame data according to the timestamp offset and the modified second timestamp t3, so that the frame image, corresponding mask frame data and corresponding live comment information are simultaneously shown on a display screen for playing at a time corresponding to the second timestamp t3, wherein when the live comment information passes through the mask frame data, an area corresponding to the mask frame data is displayed, to avoid the live comment information blocking main contents in the frame image, and enhance the user's visual experience.

The Second Embodiment

Referring to FIG. 12, a system of processing information flow applied to a live broadcast scene is taken as an example: a user performs live broadcast from 11:00 to 12:00 through a stream pushing terminal C, and the stream pushing terminal C sends information stream to server D from 11:00, server D analyzes received information stream and identifies a type of each of first data unit in the information stream, where the first data unit may be a video unit or an audio unit. If the first data unit is the video unit, the video unit is decoded, a frame image in the video unit, a first timestamp t1 and meta-information are obtained, a second timestamp t2 in the meta-information is extracted, and the frame image is identified to generate a mask frame data. A timestamp offset of the mask frame data relative to the second timestamp is obtained according to the first timestamp t1 and the second timestamp t2. The timestamp offset is added to the mask frame data. Number of mask frames and corresponding frame data are encoded to generate a second data unit, and the second data unit and the audio unit are sorted and combined according to an order of original information stream to generate a new information stream. Server D pushes the new information stream and live comment information to a CDN node; when it is at 11:00, the client F requests live information stream from the CDN node, the CDN node sends the modified information flow and the live comment information to the client F. The client F parses the information flow to extract audio information, frame image, mask frame data, and the live comment information, adjusts a display time of the mask frame data according to the timestamp offset and the second timestamp t2, so that the frame image, corresponding mask frame data and corresponding live comment information are simultaneously shown on a display screen for playing at a time corresponding to the second timestamp t2, wherein when the live comment information passes through the mask frame data, an area corresponding to the mask frame data is displayed, to avoid the live comment information blocking main contents in the frame image, and enhance the user's visual experience.

Finally, it should be noted that the above embodiments are only used to describe technical solutions of the present disclosure, rather than limiting it. Although the present disclosure has been described in detail with reference to the foregoing embodiments, those of ordinary skill in the art should understand: the technical solutions described in the foregoing embodiments can still be modified, or some or all of the technical features can be equivalently replaced, and these modifications or replacements do not make essence of corresponding technical solutions outside the scope of the technical solutions of the embodiments of the present disclosure.

What is claimed is:

1. A method of processing information flow, comprising:
   receiving, from a first client computing device, a first data unit among a plurality of first data units comprised in a first information stream, wherein the first data unit comprises image data and meta-information;
   obtaining an image and a first timestamp corresponding to the image by decoding the first data unit;
   identifying a main area of the image, wherein the main area of the image comprises a person area, an animal area, a landscape area, an architectural area, an artwork area, and a text area in the image;
   generating mask frame data based at least in part on the identified main area of the image, wherein the mask frame data comprise a timestamp offset associated with the first timestamp; and
   generating a second information stream by synthesizing the image and the mask frame data corresponding to the image.

2. The method of claim 1, further comprising:
   determining the timestamp offset of the mask frame data based on the first timestamp and the meta-information.

3. The method of claim 1, wherein the meta-information comprises a second timestamp, the second timestamp indicating a time of the image to be played on a second client computing device.

4. The method of claim 1, further comprising:
   encoding the image and the mask frame data corresponding to the image to obtain second data information; and
   generating a second data unit combining the second data information with the meta-information.

5. The method of claim 4, further comprising:
   combining a plurality of second data units to generate the second information stream; and
   sending the second information stream to a second client computing device.

6. The method of claim 1, further comprising:
   identifying the main area of the image using an image segmentation algorithm.

7. A method of synchronously displaying images frames, mask frames and comment information, comprising:
   receiving a second data unit a second information stream and comment information, wherein the second information stream is generated by synthesizing at least one image and mask frame data corresponding to the at least one image, the second information stream comprises a plurality of second data units, and the second data unit comprises meta-information and second data information;
   obtaining an image and mask frame data corresponding to the image by decoding the second data information, wherein the mask frame data comprise a mask frame generated based on a main area of the image, the mask frame data further comprise a timestamp offset indicative of a time difference between a timestamp of the mask frame and a playing timestamp of the image, and the main area of the image comprises a person area, an animal area, a landscape area, an architectural area, an artwork area, and a text area in the image; and
   synchronously displaying the image, the mask frame corresponding to the image, and the comment information based on the meta-information and the timestamp offset.

8. The method of claim 7, wherein the meta-information comprises a timestamp, wherein the timestamp indicates a time of the image to be displayed on a client computing device.

9. The method of claim 8, further comprising:
   displaying the comment information in areas other than an area where the mask frame is displayed.

10. The method of claim 9, wherein the mask frame is a transparent channel.

11. A system of processing information flow, comprising:
    at least one processor; and
    at least one memory communicatively coupled to the at least one processor and storing instructions that upon execution by the at least one processor cause the system to:
    receive, from a first client computing device, a first data unit among a plurality of first data units comprised in a first information stream, wherein the first data unit comprises image data and meta-information;
    obtain an image and a first timestamp corresponding to the image by decoding the first data unit;
    identify a main area the image, wherein the main area of the image comprises a person area, an animal area, a landscape area, an architectural area, an artwork area, and a text area in the image;
    generate mask frame data based at least in part on the identified main area of the image, wherein the mask frame data comprise a timestamp offset associated with the first timestamp; and generate a second information stream by synthesizing the image and the mask frame data corresponding to the image.

12. The system of claim 11, the at least one memory further storing instructions that upon execution by the at least one processor cause the system to:
determine the timestamp offset of the mask frame data based on the first timestamp and the meta-information.

13. The system of claim 11, wherein the meta-information comprises a second timestamp, the second timestamp indicating a time of the image to be played on a second client computing device.

14. The system of claim 11, the at least one memory further storing instructions that upon execution by the at least one processor cause the system to:
encode the image and the mask frame data corresponding to the image to obtain second data information; and
generate a second data unit by combining the second data information with the meta-information.

15. The system of claim 14, the at one memory further storing instructions that upon execution by the at least one processor cause the system to:
combine a plurality of second data units to generate the second information stream; and
send the second information stream to a second client computing device.

16. The system of claim 11, the at least one memory further storing instructions that upon execution by the at least one processor cause the system to:
identify the main area of the image using an image segmentation algorithm.

17. A system of synchronously displaying images frames, corresponding mask frames and comment information, comprising:
at least one processor; and
at one memory communicatively coupled to the at least one processor and storing instructions that upon execution by the at least one processor cause the system to:
receive a second data unit in a second information stream and comment information, wherein the second information stream is generated by synthesizing at least one image and mask frame data corresponding to the at least one image, the second information stream comprises a plurality of second data units, and the second data unit comprises meta-information and second data information;
obtain an image and mask frame data corresponding to the image by decoding the second data information, wherein the mask frame data comprise a mask frame generated based on a main area of the image, the mask frame data further comprise a timestamp offset indicative of a time difference between a timestamp of the mask frame and a playing timestamp of the image, and the main area of the image comprises a person area, an animal area, a landscape area, an architectural area, an artwork area, and a text area in the image; and
synchronously displaying the image, the mask frame corresponding to the image, and the comment information based on the meta-information and the timestamp offset.

18. The system of claim 17, wherein the meta-information comprises a timestamp, wherein the timestamp indicates a time of the image to be displayed on a client computing device.

19. The system claim 17, the at least one memory further storing instructions that upon execution by the at one processor cause the system to:
display the comment information in areas other than an area where the mask frame displayed.

20. The system of claim 19, wherein the mask frame is a transparent channel.

* * * * *